(12) United States Patent
Yang et al.

(10) Patent No.: US 9,983,971 B1
(45) Date of Patent: May 29, 2018

(54) INTELLIGENT AND ADAPTIVE BENCHMARK TESTING FRAMEWORK

(71) Applicant: Xilinx, Inc., San Jose, CA (US)

(72) Inventors: Yi-Hua E. Yang, San Jose, CA (US); Patrick Lysaght, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 441 days.

(21) Appl. No.: 14/713,814

(22) Filed: May 15, 2015

(51) Int. Cl.
  *G21C 17/00* (2006.01)
  *G06F 11/34* (2006.01)
  *G06F 11/30* (2006.01)

(52) U.S. Cl.
  CPC .................. *G06F 11/3428* (2013.01)

(58) Field of Classification Search
  CPC ................................. G06F 11/3428
  See application file for complete search history.

(56) References Cited

U.S. PATENT DOCUMENTS

2005/0120341 A1\* 6/2005 Blumenthal ........ G06F 11/3428
  717/158

OTHER PUBLICATIONS

Staelin, Carl et al., "mhz: Anatomy of a micro-benchmark," Proc. of the 1998 USENIX Conference, Jun. 15, 1998, pp. 1-12, USENIX Association, Berkeley, California, USA.

\* cited by examiner

*Primary Examiner* — Phuong Huynh
(74) *Attorney, Agent, or Firm* — Joshua Hamberger (57) ABSTRACT

Techniques for efficient benchmarking. One method includes obtaining convergent results by performing a benchmarking test with a particular length to obtain a result (time), scaling the time exponentially, performing additional benchmarking tests, obtaining results for those tests, and determining whether the results scale linearly with length. Another method includes obtaining variance for non-convergent results by performing multiple sequences of benchmarking test. Within each new sequence performed, the benchmarking tests are spaced out further apart in time. If new maximum or minimum results are obtained, then further test sequences are performed and if no new maximum or minimum results are obtained after a threshold number of sequences, then the test ends. A device and computer-readable medium for performing benchmarking are also provided herein.

19 Claims, 9 Drawing Sheets

INTELLIGENT AND ADAPTIVE BENCHMARK TESTING FRAMEWORK

TECHNICAL FIELD

Examples of the present disclosure generally relate to performance metrics and, in particular, to an intelligent and adaptive benchmark testing framework.

BACKGROUND

Benchmarking comprises techniques for measuring performance of a certain aspect of circuitry and/or software. These techniques generally involve executing a series of benchmarking operations and measuring performance characteristics associated with those operations in order to directly or indirectly infer performance characteristics of the circuitry and/or software being measured. The benchmarking operations may be performed in a series of distinct benchmarking tests, with individual benchmarking results obtained for each benchmarking test. For a variety of reasons, such as operations executing in the background, benchmarking results for different benchmarking tests may differ. Thus, to obtain benchmarking results that are deemed to be sufficiently "accurate" or representative of performance over varying background conditions, a large number of benchmarking tests are performed and the benchmarking results obtained are combined.

One aspect of benchmarking is determining the number of benchmarking tests to perform in order to obtain a sufficiently "accurate" set of benchmarking results. It is important to choose a large enough number of benchmarking tests in order to reach a high enough confidence level that the results obtained are sufficiently representative of performance. However, performing too many benchmarking tests is wasteful.

SUMMARY

A method performing benchmarking operations to obtain convergent benchmarking results is provided. The method includes obtaining a set of benchmarking parameters. The method also includes performing a first benchmarking test iteration with the set of benchmarking parameters to obtain a first benchmarking result. The method further includes evaluating the first benchmarking result against a benchmarking criteria. The method also includes generating an updated set of benchmarking parameters based on the first benchmarking result.

An electronic device for performing benchmarking operations to obtain convergent benchmarking results is provided. The electronic device includes a hardware platform that includes a benchmarking framework. The benchmarking framework includes an adaptive testing state machine and a test control module. The adaptive testing state machine is operable to perform a first benchmarking test with a first length to obtain a first benchmarking result. The adaptive testing state machine is also operable to scale the first length by a scaling factor to obtain a second length. The adaptive testing state machine is further operable to perform a second benchmarking test with the second length to obtain a second benchmarking result. The adaptive testing state machine is also operable to evaluate the first benchmarking result and the second benchmarking result to determine whether the second benchmarking result scales proportionately with the scaling factor as compared with the first benchmarking result.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting in scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

Techniques for performing benchmarking in an efficient manner are provided herein. These techniques include techniques for obtaining convergent benchmarking results when benchmarking results converge and techniques for obtaining the variance of benchmarking results when benchmarking results do not converge. Benchmarking results converge when varying benchmarking results for repeated benchmarking tests nevertheless tend towards a certain value. In general, the techniques include obtaining a set of benchmarking parameters, performing a first benchmarking test iteration with the set of benchmarking parameters to obtain a first benchmarking result, evaluating the first benchmarking result against a benchmarking criteria, and generating an updated set of benchmarking parameters based on the first benchmarking result.

Techniques for obtaining convergent benchmarking results include performing multiple benchmarking tests sequentially with exponentially scaled benchmarking length (where "length" refers to the total number of benchmarking operations) to determine whether associated absolute benchmarking results (i.e., a total amount of time taken by all the benchmarking operations performed) scale proportionately with the benchmark length (or, equivalently, whether per-operation benchmarking time is approximately equivalent across different benchmarking tests). If the benchmarking results scale proportionately for a threshold number of consecutive benchmarking tests (this threshold number may also be referred to herein as a "benchmark number confidence threshold"), then the benchmarking results for those consecutive benchmarking tests are said to be convergent and thus are deemed to be an accurate representation of performance. If the benchmarking results do not scale proportionately, then additional benchmarking tests are performed, scaling the length of each successive benchmarking test exponentially, up to a maximum length. If no proportionate scaling is found once the maximum benchmark test length is reached, then the benchmarking tests are deemed to be non-convergent.

Alternatively, instead of a maximum benchmark test length, a maximum number of tests is used. More specifically, if, after scaling the duration for that maximum number of times, no proportionate scaling is found, then the benchmarking tests are deemed to be non-convergent.

Techniques for obtaining a variance of non-convergent benchmarking results include performing multiple sequences of benchmarking tests. Each sequence may include the same number of individual benchmarking test. Successive sequences are scaled linearly in length. In each sequence, a maximum benchmarking result and minimum benchmarking result are obtained (i.e., maximum and minimum benchmark time). The maximum benchmarking result and minimum benchmarking result for a sequence is compared against the maximum benchmarking result and minimum benchmarking result for the entire period in which benchmark testing for obtaining variance is performed. If no new minimum benchmark result or maximum benchmark result is obtained after a threshold number of successive sequences of benchmarking tests, then a sufficient amount of data is deemed to have been obtained in order to properly measure the variance of the benchmarking results. However, if a new minimum benchmarking result or maximum benchmarking result is obtained in a particular sequence, then a new sequence of benchmarking tests is performed.

By performing benchmarking in the above-described manner, benchmarking results (either results themselves or a measure of variance in such results) that are deemed to be sufficiently accurate are obtained within a relatively small number of benchmarking tests.

Figure 1A:
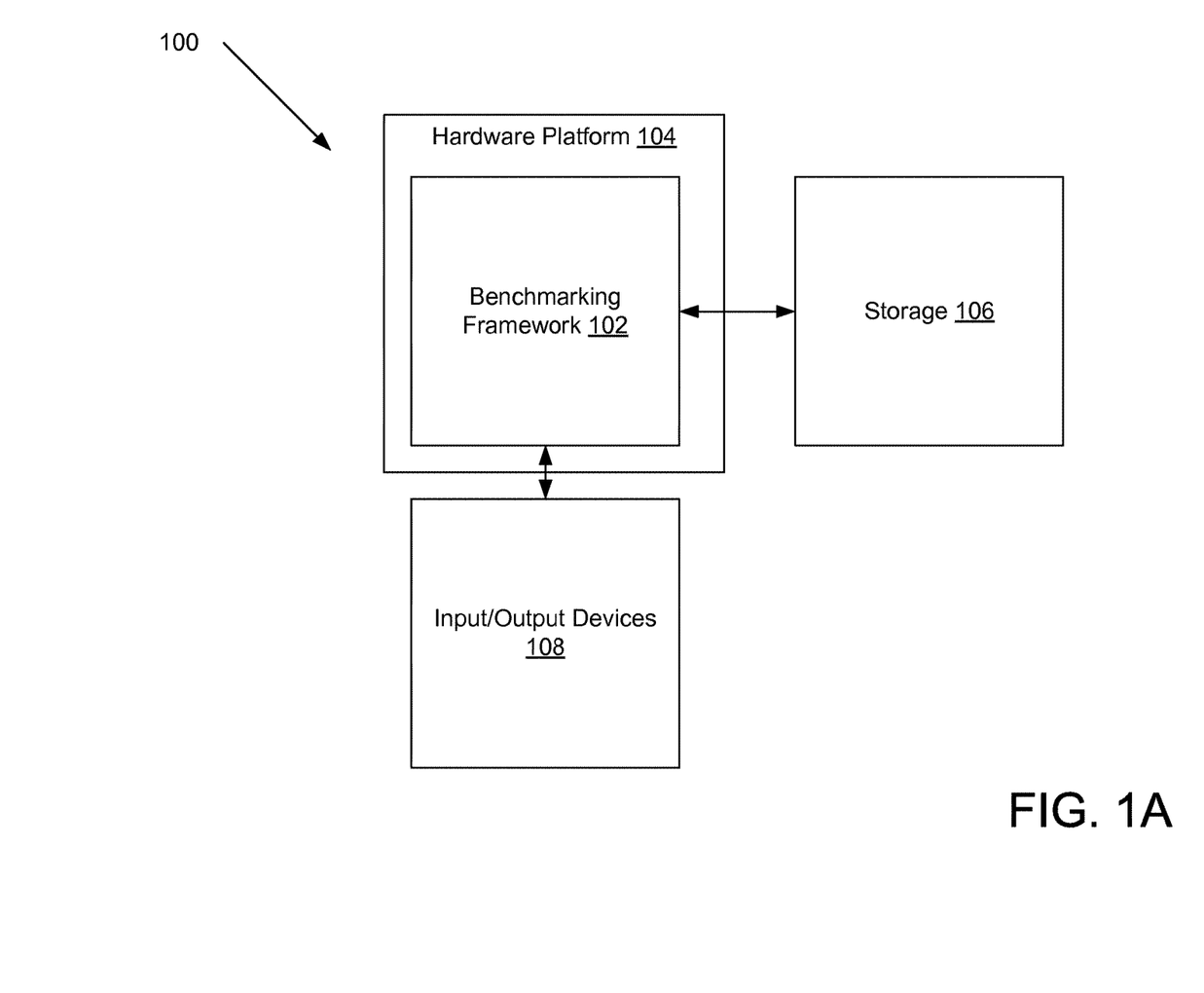
FIG. 1A is a block diagram of a benchmarking system, according to an example.

FIG. 1A is a block diagram of a benchmarking system 100, according to an example. As shown, the benchmarking system 100 includes a hardware platform 104, storage 106, and input/output devices 108. The hardware platform 104 includes a benchmarking framework 102 that is configured to efficiently obtain benchmarking measurements for hardware platform 104.

The hardware platform 104 may be any type of electronic hardware device that performs operations for which a benchmark is desired. In one example, the hardware platform 104 is a standard computer system with processor, memory, and other known components, and executes an operating system (such as Linux®, Microsoft Windows®, Mac OS®, etc.). In another example, the hardware platform 104 is a custom-designed circuit, such as an application specific integrated circuit (ASIC), application specific standard product (ASSP), or the like. In still another example, the hardware platform 104 may be implemented using a programmable integrated circuit (IC), such as a field programmable gate array (FPGA), complex programmable logic device (CPLD), or the like, as well as programmable system-on-chip (SoC) devices that include programmable logic and an embedded processing system.

The benchmarking framework 102 may be implemented as a software application executing on an operating system. Alternatively, the benchmarking framework 102 may be implemented as a layer on top of a board support package (BSP) of a bare-metal embedded system. Alternatively, the benchmarking framework 102 may be implemented as a hardware circuit in an FPGA-based system, such as an SoC, where the benchmarking framework 102 controls and tests the performance of a custom circuit implemented in the FPGA. The benchmarking framework 102 may measure benchmarking characteristics of software executing on the hardware platform 104 or of physical circuitry operating within the hardware platform 104.

To obtain reliable results, the benchmarking framework 102 may perform benchmarking in a "controlled" environment. A controlled environment is an environment in which the state of the hardware platform 104, including what inputs are received and what software is running, is known. Controlling the environment in this manner allows the results obtained by the benchmark framework 102 to be reliable and unaffected by unknown factors, and also gives the benchmark results meaning in the sense that the particular, controlled state of the hardware platform 104 is what is being tested by the benchmarking performed by the benchmark framework 102.

In some controlled environments, benchmark results will converge. More specifically, usually, benchmark results will vary, even for benchmark tests performed with the same parameters, due to variations in the particular instantaneous background state that serves as the context in which the benchmark test executes. In one example, a background state is the state of background software executing in parallel with the benchmark test. In such situations, despite the existence of variance in benchmarking results, the results from several benchmark tests converge to a particular value. Convergent benchmarking results may be obtained by running multiple benchmark tests and examining the results to confirm that they do converge.

In some other controlled environments, the background state varies to too great of a degree and benchmark results do not converge. In such controlled environments, although a convergent benchmark result may not be obtained, a measure of the variance of the system, which can be used to determine characteristics of the background state of the hardware platform 104, may be obtained. The benchmarking framework 102 performs operations to obtain convergent results when such results can be obtained and also to determine the variance of benchmark tests when benchmarking results do not converge.

Figure 1B:
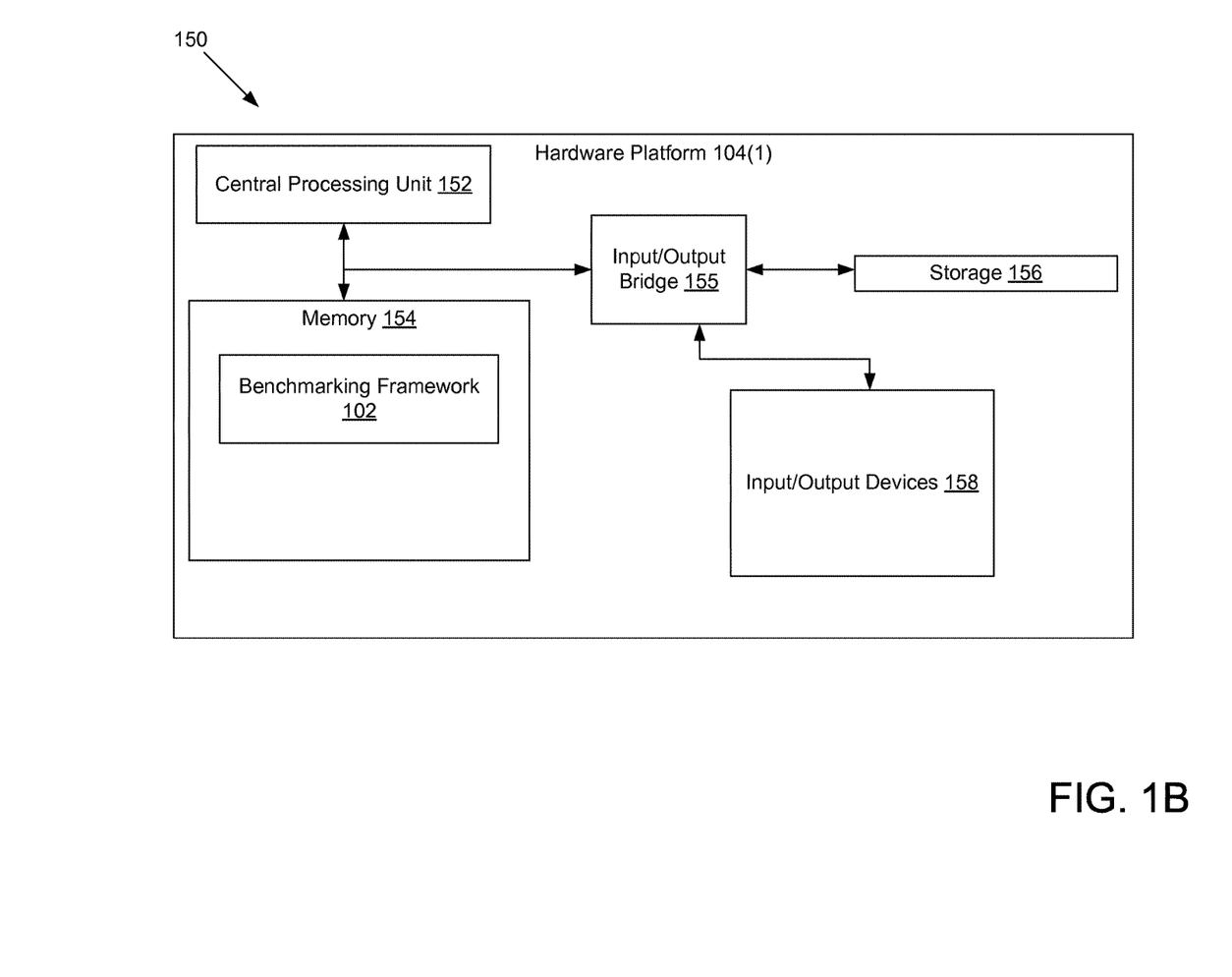
FIG. 1B illustrates a computing system that is an example of the hardware platform of FIG. 1A.

FIG. 1B illustrates a computing system 150 that is an example of hardware platform 104(1). As shown, computing system 150 includes a central processing unit (CPU) 152, memory 154, input/output bridge 155, storage 156, and input/output device 158. CPU 152 retrieves and processes instructions and data from memory 154 for processing.

Memory 154 stores instructions and data for use by CPU 152. Input/output bridge 155 couples CPU 152 and memory 154 to storage 156 and input/output devices 158. Storage 156 stores data for use by CPU 152 in a non-volatile manner. Input/output devices 158 provide an interface for interaction with a user.

Memory 154 may store benchmarking framework 102 for execution by CPU 152. When executed, benchmarking framework 102 may measure performance of operations of CPU 152 as described herein.

Figure 1C:
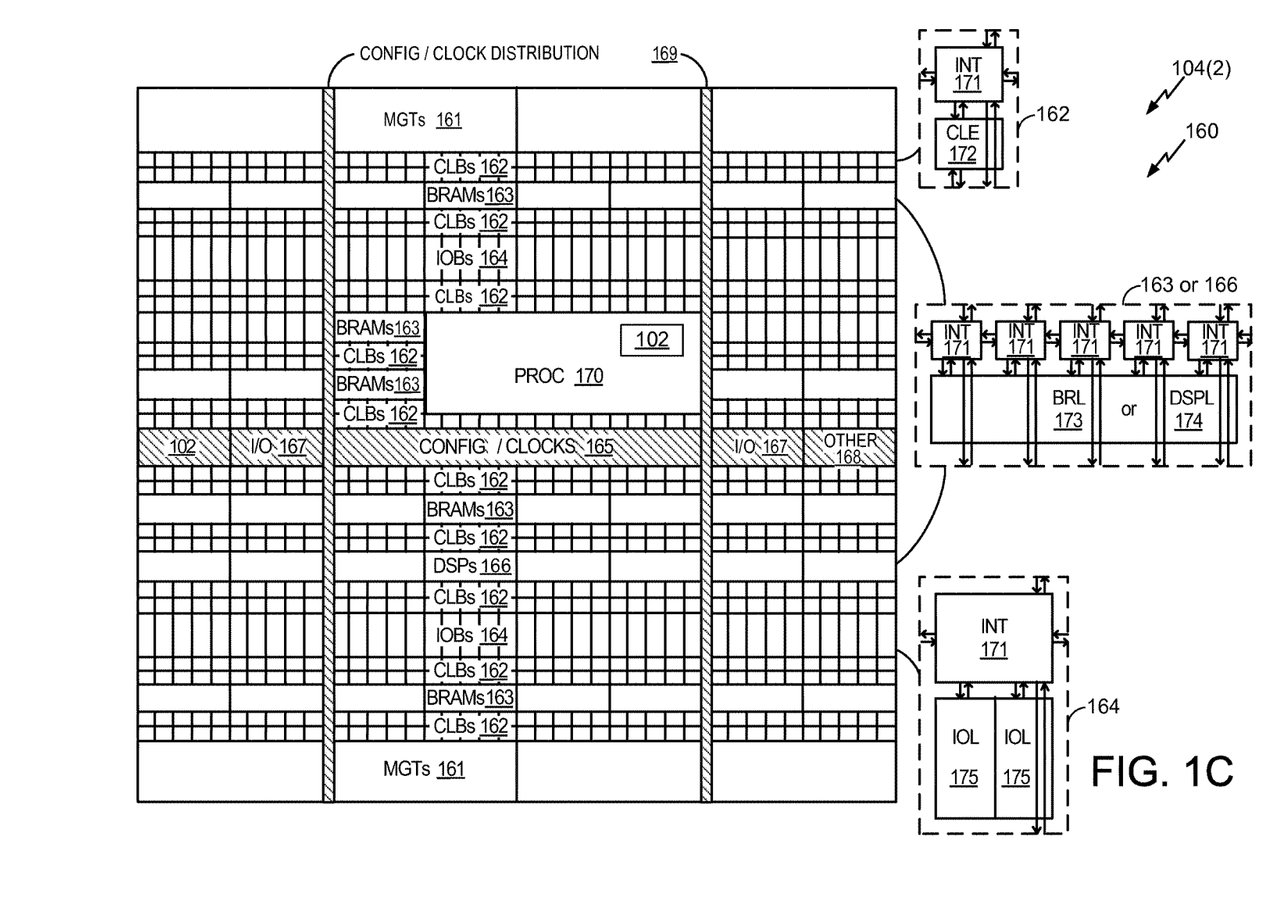
FIG. 1C illustrates an integrated circuit that is another example of hardware platform of FIG. 1A.

FIG. 1C illustrates an integrated circuit 160 that is another example of hardware platform 104(2). Integrated circuit ("IC") 160 includes a large number of different programmable tiles including multi-gigabit transceivers ("MGTs") 161, configurable logic blocks ("CLBs") 162, random access memory blocks ("BRAMs") 163, input/output blocks ("IOBs") 164, configuration and clocking logic ("CONFIG/CLOCKS") 165, digital signal processing blocks ("DSPs") 166, specialized input/output blocks ("I/O") 167 (e.g., configuration ports and clock ports), and other programmable logic 168 such as digital clock managers, analog-to-digital converters, system monitoring logic, and so forth. The IC 160 may be a field programmable gate array ("FPGA") architecture. IC 160 also includes a dedicated processor, also referred to as a "processing system" or "PROC" 170.

Optionally, each programmable tile includes a programmable interconnect element ("INT") 171 having standardized connections to and from a corresponding interconnect element in each adjacent tile. The programmable interconnect elements taken together implement the programmable interconnect structure for the illustrated IC 160. The programmable interconnect element 171 also includes the connections to and from the programmable logic element within the same tile, as shown by the examples included at the top of FIG. 1C.

For example, a CLB 162 can include a configurable logic element ("CLE") 172 that can be programmed to implement user logic plus a single programmable interconnect element ("INT") 171. A BRAM 163 can include a BRAM logic element ("BRL") 173 in addition to one or more programmable interconnect elements 171. Typically, the number of interconnect elements 171 included in a tile depends on the height of the tile. In the pictured IC 100, a BRAM tile 163 has the same height as five CLBs 162, but other numbers (e.g., four) can also be used. A DSP tile 166 can include a DSP logic element ("DSPL") 174 in addition to an appropriate number of programmable interconnect elements 171. An IOB 164 can include, for example, two instances of an input/output logic element ("IOL") 175 in addition to one instance of the programmable interconnect element 171. As will be clear to those of skill in the art, the actual I/O pads connected, for example, to the I/O logic element 175 typically are not confined to the area of the input/output logic element 175.

In the pictured IC 100, a horizontal area near the center of the die is used for configuration, clock, PL sysmon 176, I/O 167, and other control logic. This horizontal area may include benchmarking framework 102, implemented as a fixed or configurable hardware circuit. In this context, benchmarking framework 102 may measure aspects of the configurable elements (e.g., the logic blocks) of IC 100 or of a custom circuit configured into the configurable elements of IC 100. Vertical columns 169 extending from this horizontal area or column are used to distribute the clocks and configuration signals across the breadth of the IC.

Optionally, IC 160 includes additional logic blocks that disrupt the regular columnar structure making up a large part of the IC. The additional logic blocks can be programmable blocks and/or dedicated logic. For example, processor block 170 spans several columns of CLBs and BRAMs.

PROC 170 can be implemented as a hard-wired processor that is fabricated as part of the die that implements the programmable circuitry of the IC 160 and does not include the programmable tiles included within the PL domain. PROC 170 can represent any of a variety of different processor types and/or systems ranging in complexity from an individual processor, e.g., a single core capable of executing program code, to an entire processor system having one or more cores, modules, co-processors, interfaces, or the like.

In a more complex arrangement, for example, PROC 170 can include one or more cores, e.g., central processing units, cache memories, a memory controller, unidirectional and/or bidirectional interfaces configurable to couple directly to I/O pins, e.g., I/O pads, of the IC 160 and/or couple to the programmable circuitry of the IC 160. The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC 160. For example, portions shown in FIG. 1C that are external to PROC 170 can be considered part of the, or the, programmable circuitry of the IC 160.

PROC 170 may include benchmarking framework 102. In this context, benchmarking framework 102 may measure aspects of performance of PROC 170. In addition, a portion of benchmarking framework 102 may reside in the horizontal area described above and another portion of benchmarking framework 102 may reside in PROC 170.

Note that FIG. 1C is intended to illustrate only an exemplary IC 160 architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC 100 more than one adjacent row of CLBs 162 is typically included wherever the CLBs 162 appear, to facilitate the efficient implementation of user logic, but the number of adjacent CLB 162 rows varies with the overall size of the IC 100.

Figure 2A:
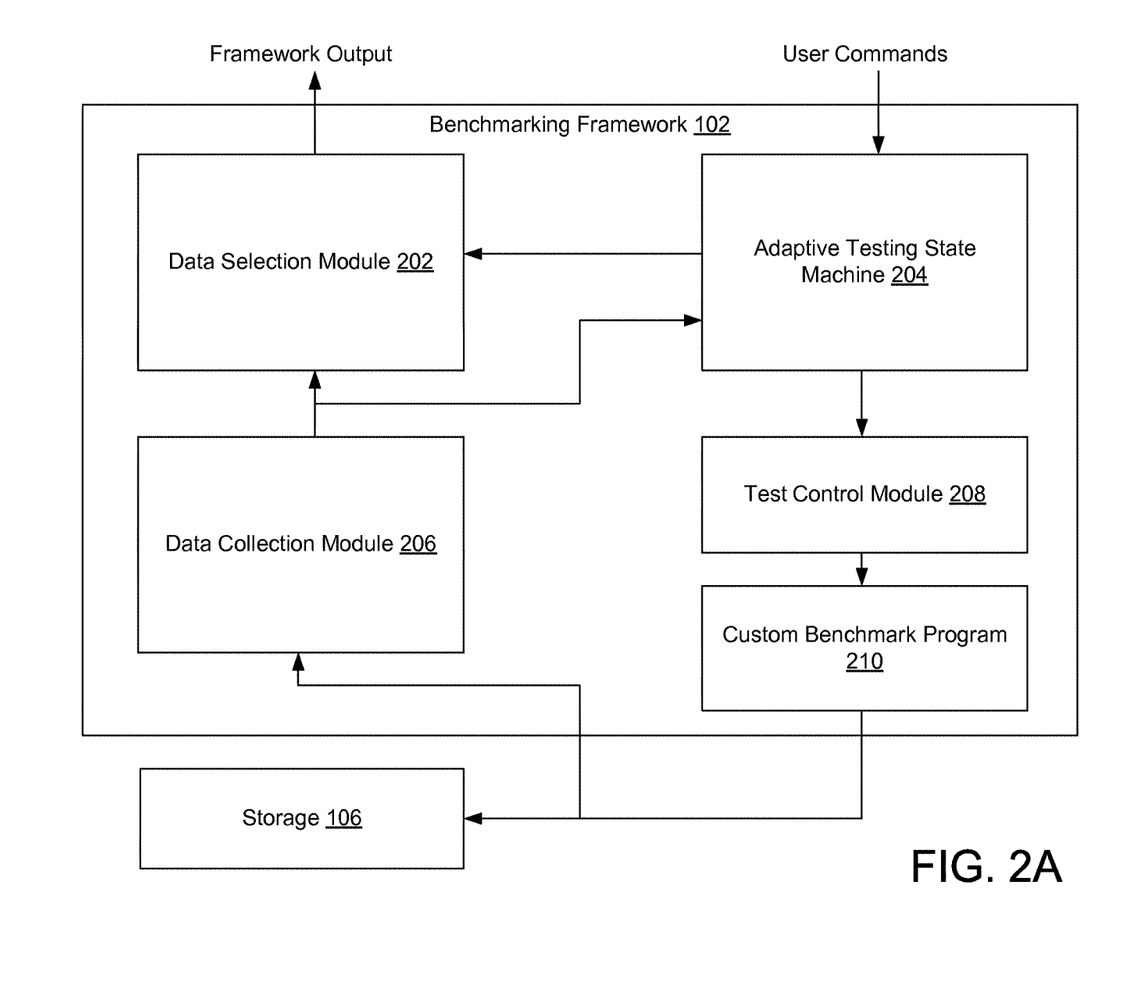
FIG. 2A is a block diagram illustrating the benchmarking framework of FIG. 1A, according to an example.

FIG. 2A is a block diagram illustrating the benchmarking framework 102 of FIG. 1A, according to an example. As shown, the benchmarking framework 102 includes a data selection module 202, an adaptive testing state machine 204, a data collection module 206, a test control module 208, and a custom benchmark program 210. Storage 106 of FIG. 1A is also illustrated in FIG. 2A.

The adaptive testing state machine 204, test control module 208, custom benchmark program 210, and data collection module 206 work together to perform efficient benchmark tests. The adaptive testing state machine 204 provides overall control of custom benchmark program 210 via test control module 208. The adaptive testing state machine 204 may be controlled by a user via user commands but once started, is configured to automatically adapt benchmark test iterations without user input. Test control module 208 controls custom benchmark program 210 on a more granular level than the adaptive testing state machine 204. Custom benchmark program 210 executes benchmark operations and provides benchmark results as output data to storage 106 for future use and to data collection module 206. Data collection module 206 collects data from custom benchmark program 210 and provides that data to adaptive testing state machine 204 as feedback and to data selection module 202 for selection of particular benchmark data for output (to, for example, a monitor for display to a user).

The adaptive testing state machine 204 transmits benchmarking controls to the test control module 208. The test control module 208 controls the custom benchmark program 210 based on these benchmarking controls. The benchmarking controls include a delay between tests (a "test delay"), a length of tests (a "test length"), and test parameters. The test delay represents how long the test control module 208 waits after commanding the custom benchmark program 210 to perform a benchmark test to perform another benchmark test. The test length represents the number of operations performed for an individual benchmark test. The test parameters represent custom parameters provided for use by the specific benchmark operations executed by custom benchmark program 210.

Test control module 208 controls the custom benchmark program 210 to execute benchmarking tests by providing test control inputs that are based on the benchmarking controls. The test control module 208 translates the delay and length parameters provided by the adaptive testing state machine 204 to the test control module 208 into the test control inputs. The test control inputs include a start signal, which causes the custom benchmark program 210 to start benchmarking operations, a stop signal, which causes the custom benchmark program 210 to stop performing benchmarking operations, and the test parameters received from the adaptive testing state machine 204. The test control module 208 thus starts and stops benchmarking operations on the custom benchmark program 210 as dictated by the delay and length parameters.

The custom benchmark program 210 performs specific benchmarking operations to generate benchmarking test results that are associated with performance characteristics of a benchmarking test subject, where these test results indicate the duration of a particular benchmarking test. In an example, the benchmarking test subject is a hardware component of the hardware platform 104 illustrated in FIG. 1A. In the example hardware platform 104(2) illustrated in FIG. 1C, the benchmarking test subject may be the processing system 170 or a digital circuit configured into the configurable tiles. The benchmarking operations generally consist of a sequence of operations performed by the benchmark test subject in order to measure the performance characteristics of the benchmarking test subject. The performance characteristics may be, for example, the speed with which a particular group of benchmarking operations are performed, the throughput (number of operations performed per unit of time), an absolute number of benchmarking operations performed, characteristics related to memory performance such as bandwidth and latency, characteristics related to computer networking performance such as bandwidth and latency, and characteristics related to input/output performance, as well as many other types of characteristics. It should be understood that the custom benchmark program 210 can be designed to perform any type of desired benchmarking operations.

The adaptive testing state machine 204 determines the delay and length parameters of the benchmarking controls based on feedback received from custom benchmark program 210 via data collection module 206. The adaptive testing state machine 204 makes these determinations to perform efficient benchmarking. More specifically, benchmarking results obtained every time custom benchmark program 210 performs a single benchmark test (where a single benchmark test represents a single instance of the custom benchmark program 210 being started and stopped by the test control module 208) may vary due to "background" operations performed by the hardware platform 104. The background operations generally involve operations other than the operations related to benchmarking that are performed concurrently with the benchmarking operations. Thus, it is desirable to perform benchmarking operations multiple times in order to obtain a large number of benchmarking results that can be averaged or otherwise combined in order to arrive at benchmarking results for which a level of confidence exists. However, because benchmarking tests consume computing resources, it is desirable to perform fewer, rather than a greater number of benchmarking tests.

The adaptive testing state machine 204 may perform benchmarking operations as described above (i.e., performing benchmarking operations, obtaining results, and measuring the results against a confidence threshold) in one of two modes: a convergent mode for obtaining convergent benchmark results, and a non-convergent mode for obtaining variance information.

In the convergent mode, adaptive testing state machine 204 performs multiple benchmarking tests, scaling the benchmarking length (number of operations) for each benchmarking test until the benchmarking times (referred to herein as "benchmarking results") from the benchmarking tests scale proportionally with the benchmarking length for a threshold number of benchmarking tests. When the benchmarking times scale proportionately for the threshold number of benchmarking tests, the adaptive testing state machine 204 stops performing benchmarking tests and deems the benchmarking results that scale proportionately to be the desired convergent results. Scaling proportionately for the threshold number of benchmarking tests means that the benchmarking results for at least a threshold number of benchmarking tests scale proportionately.

A benchmarking result from one benchmarking test may scale proportionately with a benchmarking result from a previous benchmarking test if the benchmarking result for the later benchmarking test is equal to the benchmarking result for the earlier benchmarking test multiplied by a scaling factor, where the scaling factor is equal to the factor by which the length of the benchmarking tests is increased. Optionally, proportionate scaling may be satisfied within a particular tolerance. More specifically, benchmarking results from two successive benchmarking tests may be deemed to proportionately scale within a tolerance when a second benchmarking result associated with a later benchmarking test is within a particular tolerance value of the benchmarking result of the earlier benchmarking test multiplied by a scaling factor. In one example, a tolerance is 5%, a first test has a result of 1000 (arbitrary units), the scaling factor is 2 and a second test has a result of 2025. The first test result of 1000 multiplied by the scaling factor of 2 is 2000. 2025 is within the 5% tolerance of 2000. Thus, the benchmarking results from the two benchmarking tests scale proportionately with the length, within a tolerance.

The benchmarking framework 102 may perform benchmarking tests with a limit to the number of benchmarking tests that may be performed. If the benchmarking framework 102 reaches this limit and still has not detected benchmarking tests whose results scale proportionately with length, then the benchmarking framework 102 ends the benchmarking tests without having obtained convergent benchmarking results. At this point, benchmarking framework 102 may calculate a performance estimate based on the data already obtained.

In the non-convergent mode, adaptive testing state machine 204 performs multiple sequences of benchmarking tests. Each sequence of benchmarking tests includes a particular number of individual benchmarking tests. The adaptive testing state machine 204 obtains the minimum and maximum of the benchmarking result for each test in the executed sequences of benchmarking tests. The adaptive testing state machine 204 also scales the scaling factor and performs more sequences of benchmarking tests until no new maximum or minimum benchmarking result is obtained for a threshold number of sequences of benchmarking tests (also referred to herein as a "benchmark sequence number confidence threshold"). Variance may be any well-known representation of the degree to which the benchmarking results vary across different benchmarking tests, such as mathematical variance, standard deviation, or any other measure of variance.

The benchmarking framework 102 may perform sequences of benchmarking tests with a limit to the number of sequences that may be performed. If the benchmarking framework 102 reaches this limit and still detects new maximum benchmarking results or new minimum benchmarking results, then the benchmarking framework 102 ends the benchmarking tests.

In either the convergent mode or the non-convergent mode, the benchmarking framework 102 may look for a threshold number of benchmarking tests that meet the particular criteria (i.e., proportionate scaling for the convergent mode or no new minimum or maximum for the non-convergent mode). When the criteria is met for that particular threshold number of benchmarking tests, then the benchmarking tests are deemed to be sufficiently accurate and benchmarking is stopped.

By performing benchmarking in the above manner, with the above-described feedback, the benchmarking framework 102 is able to perform a number of benchmarking tests that is fewer than in benchmarking techniques that do not use the feedback described above, thus improving the speed of benchmarking.

Note that although specific test parameters such as length and specific results such as time are described, the test parameters and results may be of different types than those described.

Figure 2B:
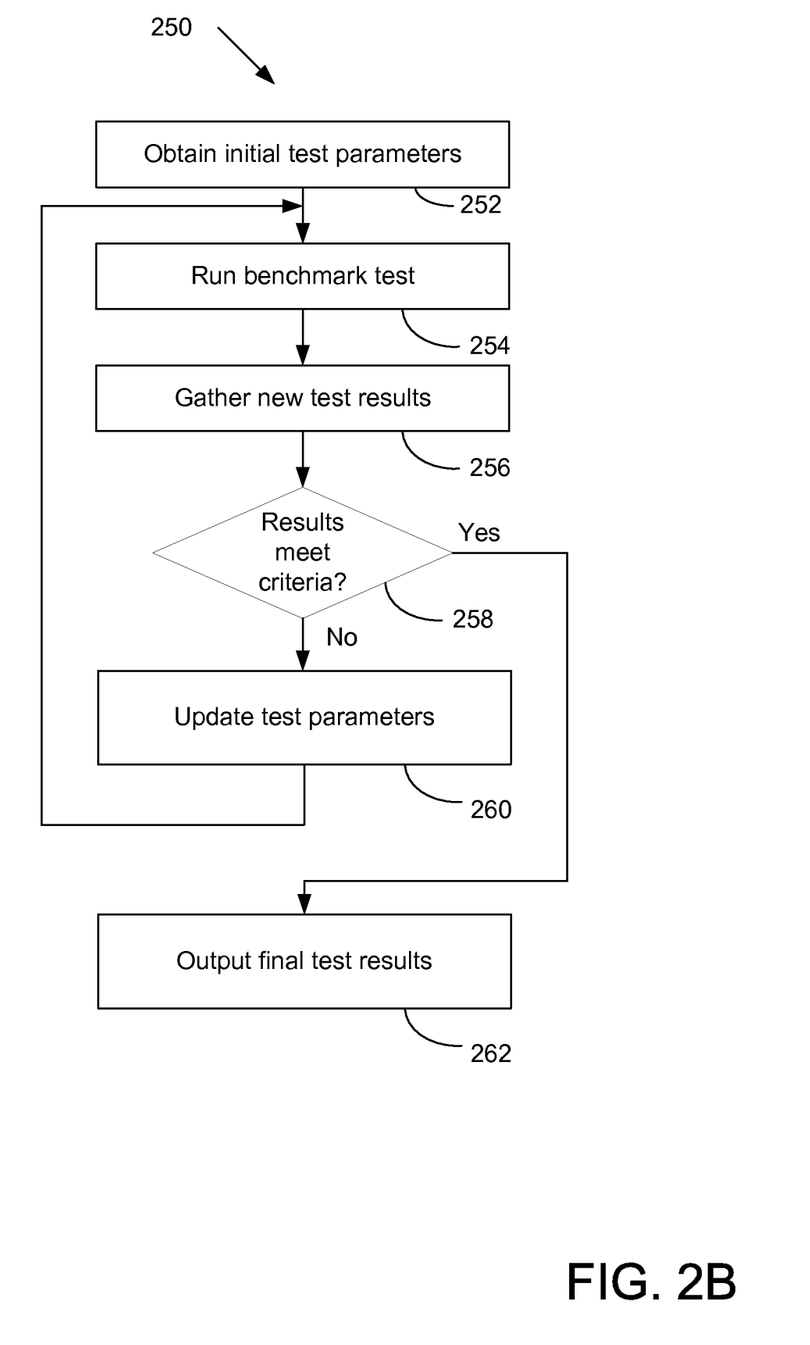
FIG. 2B is a flow diagram of method operations for adaptively performing benchmarking operations, according to an example.

FIG. 2B is a flow diagram of method operations for adaptively performing benchmarking operations, according to an example. Those of skill in the art will recognize that the actual order of operations may vary and that a wide variety of operations orders may be used. Additionally, although described in conjunction with the systems of FIGS. 1-2A, those of skill in the art will realize that any entity that performs the operations would be within the scope of the present disclosure.

The method 250 begins at operation 252, where adaptive testing state machine 204 identifies initial test parameters. In one example, the initial test parameters may be a test length. At operation 254, based on the chosen test parameters, adaptive testing state machine 204 causes the benchmark test to be run (via, e.g., test control module 208). At operation 256, data collection module 206 gathers test results. In one example, the test results include the duration of the benchmark test. At operation 258, adaptive testing state machine 204 determines whether the results meet a criteria. Conceptually, the criteria determines that the number of benchmark tests executed provide "adequate" results.

If the results do not meet the criteria, then the method proceeds to operation 260, where adaptive testing state machine 204 updates the test parameters. For example, adaptive testing state machine 204 may increase the length of the test. After operation 260, the method 250 returns to operation 252. If at operation 258, the results do meet the criteria, then adaptive testing state machine 204 determines that no more testing is to be performed and at operation 262, outputs the final testing results.

Figure 3:
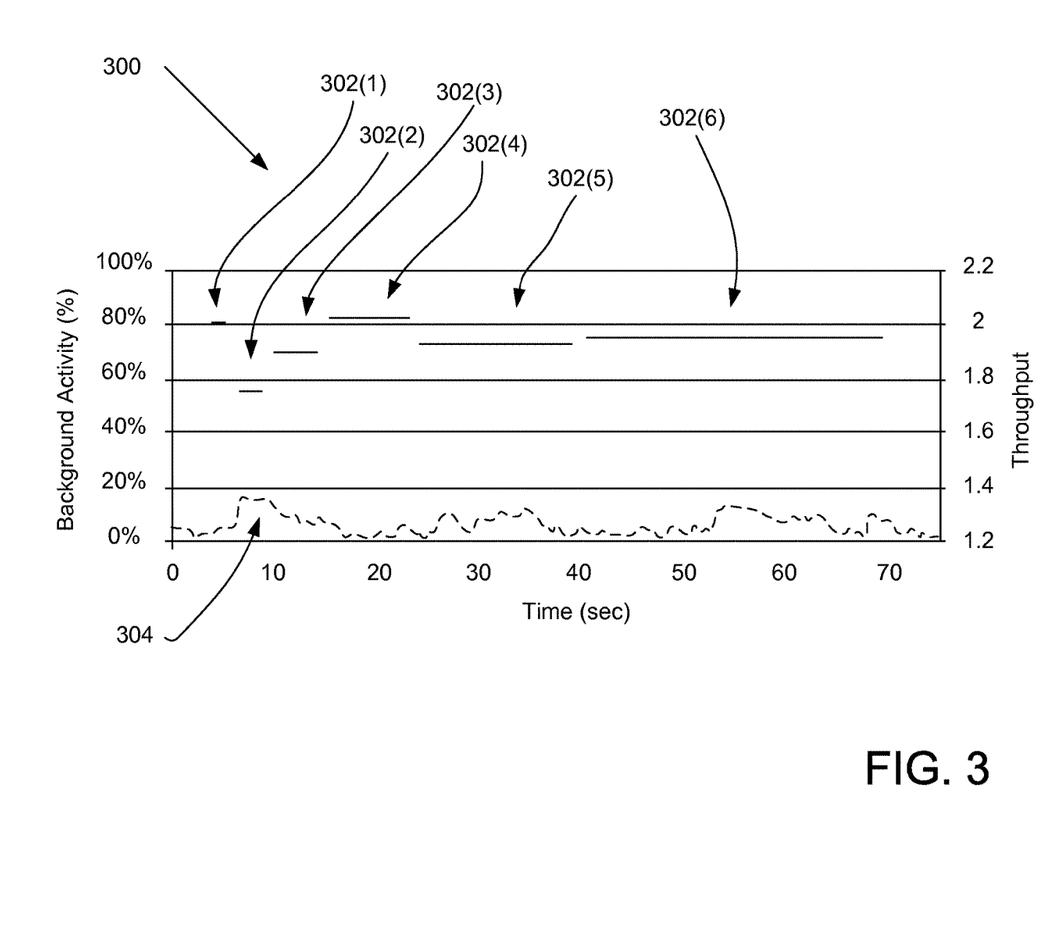
FIG. 3 is a graph that illustrates example benchmarking operations performed by the benchmarking framework of FIG. 1A.

FIG. 3 is a graph 300 that illustrates example benchmarking operations performed by the benchmarking framework 102 of FIG. 1A. The graph 300 illustrates benchmarking results associated with several benchmarking tests 302. The graph 300 also illustrates background activity 304, which represents an amount of processing power being utilized by computer operations being performed in the background (which may include, for example, programs or processes executed in parallel to the benchmarking operation associated with the benchmarking tests, and may also include, for example, other operations such as operations related to handling input/output, interrupts, and the like). The graph 300 is a plot of time on the x-axis versus background activity on the y-axis in percent of total capacity for the dotted lines and versus throughput on the y-axis for the solid lines (where throughput is operations completed per unit of time).

As can be seen, the length of each benchmarking tests 302 increases as time progresses. Thus, the second benchmarking test 302(2) has a longer length than the first benchmarking test 302(1), the third benchmarking test 302(3) has a longer length than the second benchmarking test 302(2), and so on. More specifically, the length increases exponentially.

In graph 300, the throughput characteristic best shows when benchmarking results (times) scale proportionately with length (number of operations). More specifically because throughput is operations performed per unit of time, benchmarking results for two adjacent tests scale proportionately with length when the throughput is roughly equal. In the graph 300, the benchmarking test 302(5) and the benchmarking test 302(6) are said to proportionately scale because the values associated with each are identical within a tolerance value (here, 5%). The results illustrated by graph 300 are obtained by benchmarking framework 102 performing benchmarking tests until two adjacent benchmarking tests proportionately scale. Because the first benchmarking tests that proportionately scale are benchmarking test 302(5) and benchmarking test 302(6), benchmarking framework 102 performs the benchmarking tests 302 shown and stops after performing benchmarking test 302(6).

In the example illustrated in FIG. 3, the threshold number of tests for which benchmarking results proportionately scale is 2, but in other examples of the convergent mode, this threshold number could be increased.

In addition to the benchmarking tests 302, graph 300 also illustrates background activity 304. The background activity 304 illustrates a reason why the results from the benchmarking tests 302 may vary over time. Background activity associated with the first benchmarking test 302(1) is relatively low, and thus the throughput associated with the first benchmarking test 302(1) is relatively high. On the other hand, background activity associated with the second benchmarking test 302(2) is relatively high, and so the throughput associated with the second benchmarking test 302(2) is relatively low. The results for the various benchmarking tests 302 vary due to the level of background activity. Increasing the duration of the benchmarking tests 302 serves to identify a window of time that includes a sufficiently diverse amount of background activity that is generally representative of the different levels of background activity that can occur on hardware platform 104, at least in the particular controlled environment in which the benchmarking tests are executed. Increasing the duration of and performing further benchmarking tests will not provide more accurate benchmarking results.

In some situations, the benchmarking results may not converge. In such a situation, benchmarking operations may be useful to infer the background activity of the system. Further, benchmarking operations may be used to determine the "variance" of benchmarking operations, which may help to describe "best case" and "worst case" results for system performance.

Figure 4:
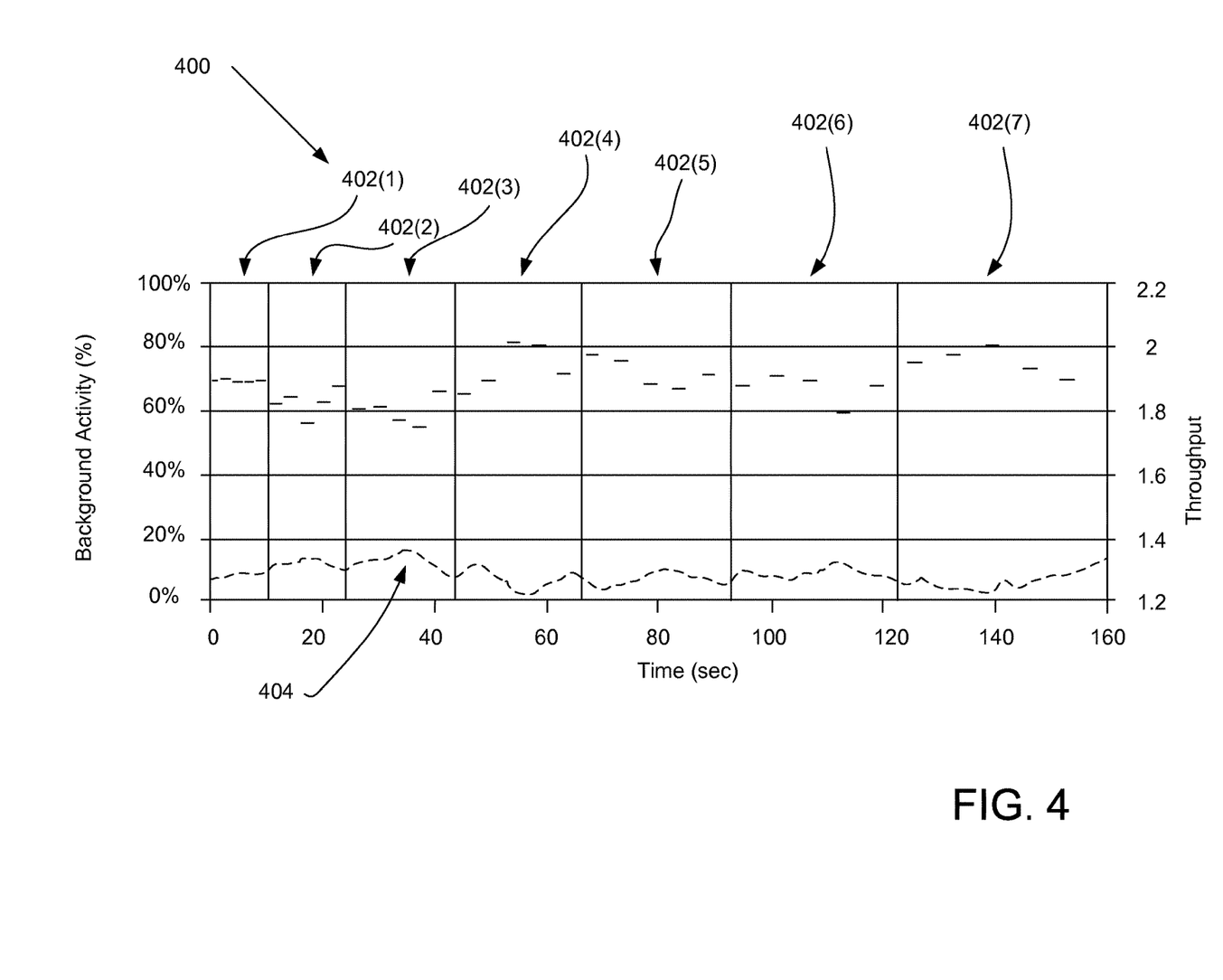
FIG. 4 is a graph that illustrates an example benchmarking operation performed by benchmarking framework of FIG. 1A.

FIG. 4 is a graph 400 that illustrates an example benchmarking operation performed by benchmarking framework 102 of FIG. 1A. The graph 400 illustrates throughput associated with several sequences 402 of benchmarking tests. The durations of the sequences 402 increase linearly as time proceeds forward. Each sequence 402 of benchmarking tests may include the same number of benchmarking tests that each have the same length. To accommodate the increase in duration, the benchmarking tests are spaced apart from each other in time to a degree that is dependent on the duration of the sequence 402 of benchmarking tests. The duration of the sequences 402 of benchmarking tests is increased linearly with each succeeding sequence 402 of benchmarking tests.

In each of the sequences 402, the benchmarking framework 102 performs benchmarking tests and obtains benchmarking results for each of the tests. Then, the benchmarking framework 102 determines a minimum benchmarking result and a maximum benchmarking result for that particular sequence 402. The benchmarking framework 102 performs subsequent sequences 402 of benchmarking tests, scaling up the duration of each subsequent sequence 402 of benchmarking test linearly until no new maximum benchmarking result or minimum benchmarking result has been obtained for a threshold number of sequences 402. At this point, benchmarking framework 102 deems that it has determined benchmarking results that are sufficiently representative of the variance in benchmarking results for the hardware platform 104.

In FIG. 4, for the first sequence 402(1) of benchmarking tests, the benchmarking framework 102 executes the sequence 402 and obtains a maximum and minimum benchmarking result, which, as can be seen in FIG. 4, are fairly close together. Note that although throughput, rather than "benchmarking result," or length of time to perform the test, is shown. However, because each individual benchmarking test has the same length, change in throughput is proportional to length of time to perform the test.

For the second sequence 402(2), the benchmarking tests produce a new minimum benchmarking result. The third sequence 402(3) also produces a new minimum benchmarking result and the fourth sequence 402(4) produces a new maximum benchmarking result. None of the fifth sequence 402(5), the sixth sequence 402(6), and the seventh sequence 402(7) produces new minimum or maximum benchmarking results. In the example shown in FIG. 4, the threshold after which a data set deemed to include a sufficient amount of variance for the hardware platform 104 is three sequences 402 of benchmark tests. By the seventh sequence 402(7), because three sequences 402 of benchmarking tests have passed where no new minimum benchmark result or maximum benchmark result is measured, benchmarking framework 102 stops performing benchmarking operations.

As with the example described with respect to FIG. 3, the background activity 404 is shown and affects the benchmarking results. Specifically, higher background activity 404 is associated with lower benchmarking results and lower background activity 404 is associated with higher benchmarking results.

Figure 5:
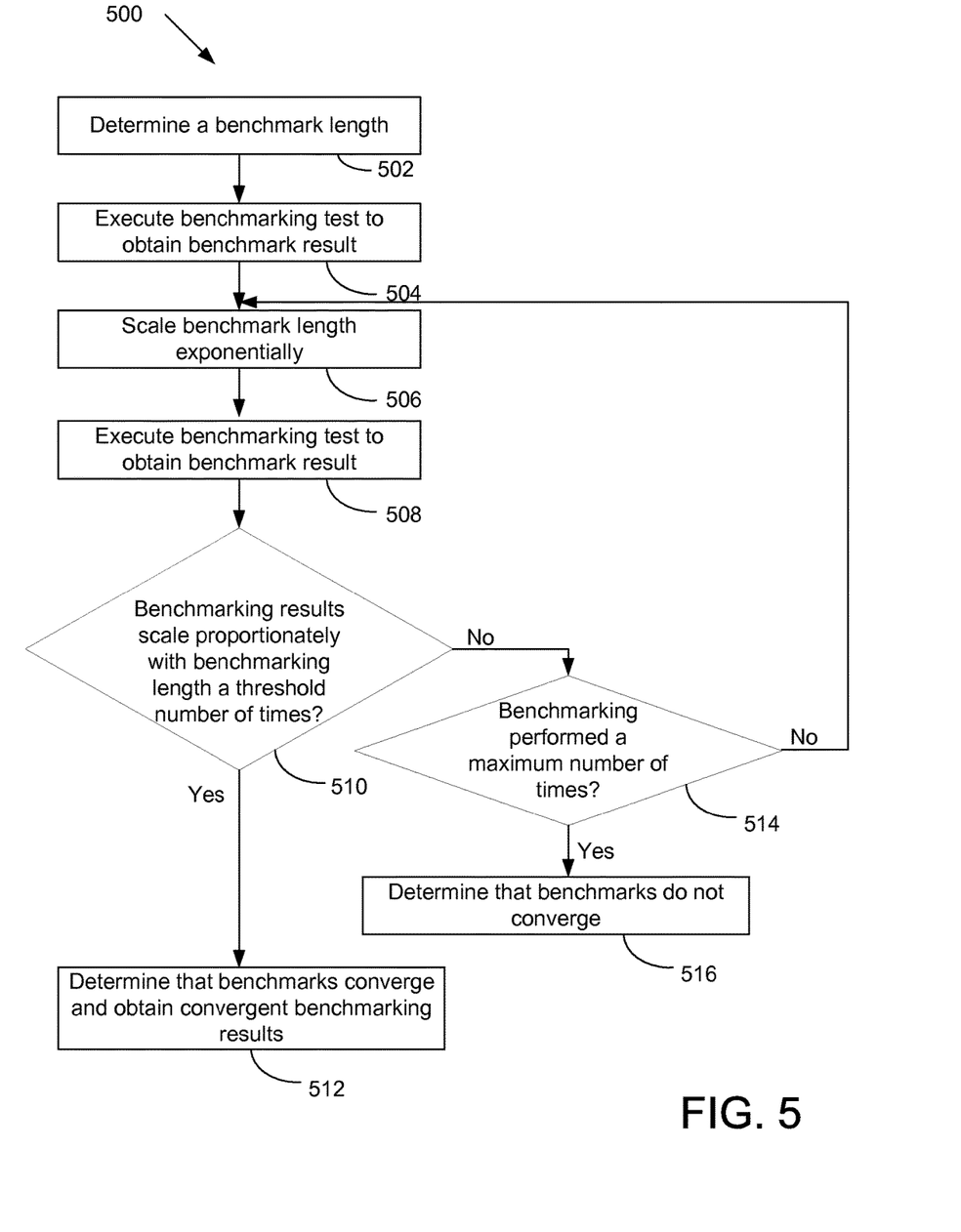
FIG. 5 is a flow diagram of method operations for determining benchmarking results, according to an example.

FIG. 5 is a flow diagram of method operations for determining benchmarking results, according to an example. Those of skill in the art will recognize that the actual order of operations may vary and that a wide variety of operation orders may be used. Additionally, although described in conjunction with the systems of FIGS. 1-2A, those of skill in the art will realize that any entity that performs the operations would be within the scope of the present disclosure.

As shown, a method 500 begins at operation 502, at which the benchmarking framework 102 determines a benchmark length for performing a benchmarking test. This benchmark length represents the number of operations to be performed by a first benchmarking test to be performed by the benchmarking framework 102. At operation 504, the benchmarking framework 102 executes a benchmarking test with the benchmark length to obtain a benchmark result. At operation 506, the benchmarking framework 102 exponentially scales the benchmark length. At operation 508, the benchmarking framework 102 executes a benchmarking test with the exponentially scaled benchmark length to obtain a benchmarking result. At operation 510, the benchmarking framework 102 determines whether the benchmarking results scale proportionately with the benchmarking length for a threshold number of times. If the benchmarking results scale proportionately with the benchmarking length for a threshold number of times, then the method proceeds to operation 512, where the benchmarking framework 102 determines that the benchmarks converge and obtains the convergent benchmarking results. If at operation 512 the benchmarking results do not scale proportionately with the benchmarking length for a threshold number of times, then the method proceeds to operation 514.

At operation 514, the benchmarking framework 102 determines whether benchmarking has been performed a maximum number of times. If the benchmarking has been performed a maximum number of times, then the benchmarking framework 102 determines that the benchmarks do not converge and ends benchmarking. Based on the data already retrieved, the benchmarking framework 102 may calculate an estimate of the benchmarking results. If, at operation 514, the benchmarking has not been performed a maximum number of times, then the method returns to operation 506.

Figure 6:
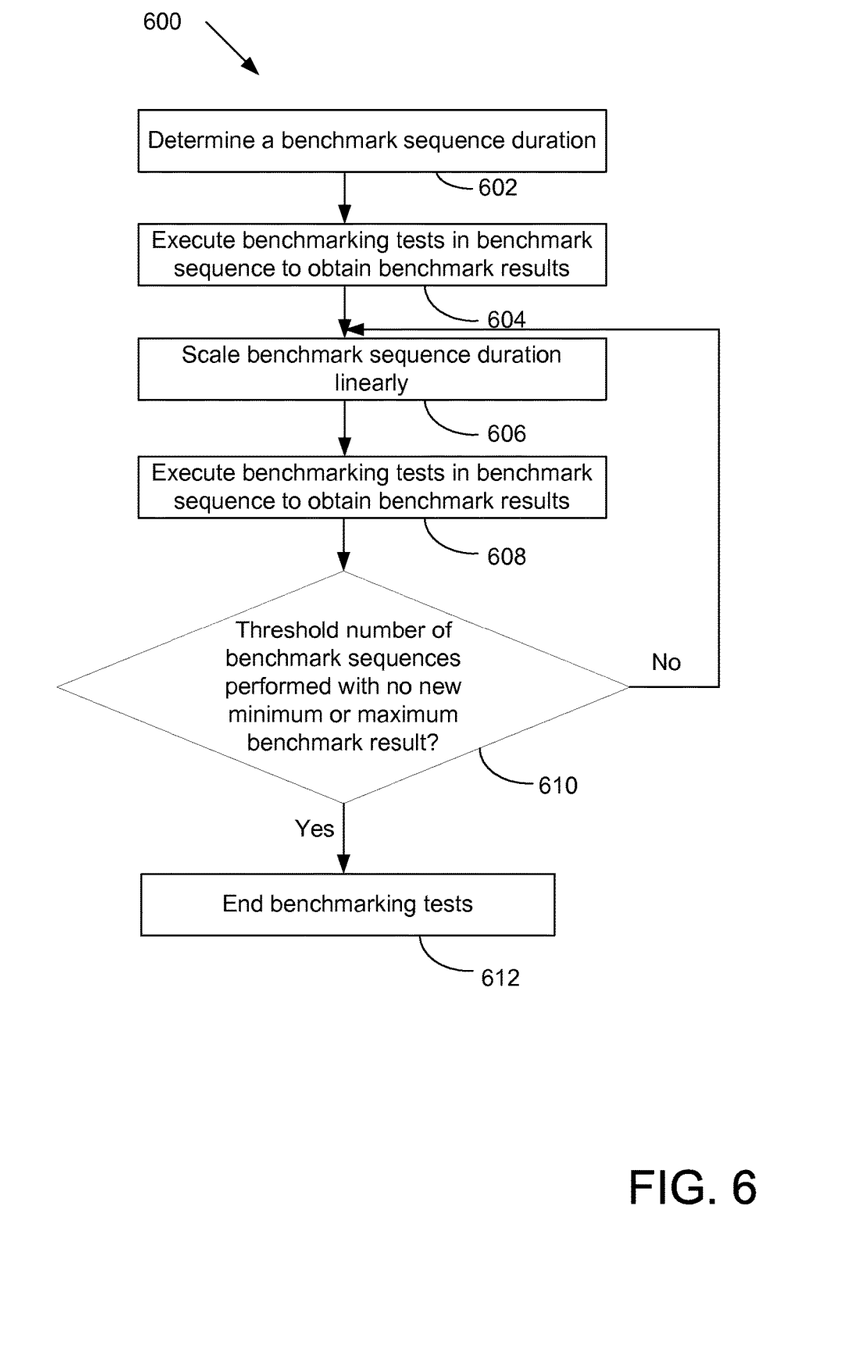
FIG. 6 is a flow diagram of method operations for determining variance in benchmarking results, according to an example.

FIG. 6 is a flow diagram of method operations for determining variance in benchmarking results, according to an example. Those of skill in the art will recognize that the actual order of operations may vary and that a wide variety of operation orders may be used. Additionally, although described in conjunction with the systems of FIGS. 1-2A, those of skill in the art will realize that any entity that performs the operations would be within the scope of the present disclosure.

As shown, a method 600 begins at operation 602, where benchmarking framework 102 determines a benchmark sequence duration. This benchmark sequence duration indicates the duration of a sequence of benchmarking tests to perform for determining the variance of benchmarking results. At operation 604, benchmarking framework 102 executes benchmarking tests for the benchmark sequence to obtain benchmark results for those benchmark tests. Benchmarking framework 102 may execute the same number of benchmarking tests in each sequence of benchmarking tests. Further, benchmarking framework 102 executes each benchmarking test for the same length but spaced apart by an increasingly larger amount of time. At operation 606, benchmarking framework 102 scales the benchmark sequence duration linearly. More specifically, for each benchmark sequence, benchmarking framework 102 sets the duration of that benchmark sequence to a scaling factor multiplied by a duration of the previous benchmark sequence. At operation 608, benchmarking framework 102 executes benchmarking tests in the benchmark sequence to obtain benchmark results. At operation 610, benchmarking framework 102 determines whether, for a threshold number of the most recent benchmarking sequences, there has been no new minimum or maximum benchmarking result. If there has been no new maximum or minimum benchmarking result for a threshold number of the most recent benchmarking sequences, then the method proceeds to operation 612, where the benchmarking framework 102 ends the benchmark tests. If, at operation 610, there has been a new maximum or minimum benchmarking result for a threshold number of the most recent benchmarking sequences, then the method returns to operation 606.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more example implementations may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific example implementations, other and further example implementations may be devised without departing from the basic scope thereof, and the scope thereof is determined by the claims that follow.

What is claimed is:

1. A method for performing benchmarking operations, the method comprising:
    performing, within a processing system of a hardware system, a first benchmarking test iteration with a set of benchmarking parameters on a component comprising a circuit of the hardware platform to obtain a first benchmarking result, wherein the set of benchmarking parameters includes a first length;
    scaling the first length by a scaling factor to obtain a second length;
    performing, within the processing system, a second benchmarking test on the component with the second length to obtain a second benchmarking result; and
    evaluating the first benchmarking result and the second benchmarking result to determine whether the second benchmarking result scales proportionately with the scaling factor as compared with the first benchmarking result.

2. The method of claim 1, wherein:
    evaluating the first benchmarking result and the second benchmarking result comprises determining that the second benchmarking result does not scale proportionately with the scaling factor as compared with the first benchmarking result; and
    the method further comprises:
        scaling the second length by the scaling factor to obtain a third length,
        performing a third benchmarking test with the third length, and
        evaluating the second benchmarking result and the third benchmarking result to determine whether the third benchmarking result scales proportionately with the scaling factor as compared with the second benchmarking result.

3. The method of claim 1, wherein evaluating the first benchmarking result and the second benchmarking result comprises determining that the second benchmarking result scales proportionately with the scaling factor as compared with the first benchmarking result.

4. The method of claim 3, further comprising:
    in response to determining that the second benchmarking result scales proportionately with the scaling factor as compared with the first benchmarking result, determining that benchmarking results converge.

5. The method of claim 3, further comprising:
    scaling the second length by the scaling factor to obtain a third length,
    performing a third benchmarking test with the third length to obtain a third benchmarking result, and
    determining that the third benchmarking result scales proportionately with the scaling factor as compared with the second benchmarking result.

6. The method of claim 5, further comprising:
    determining that benchmarking results scale proportionately with the scaling factor for a number of times equal to a benchmark number confidence threshold, and
    determining that the first benchmarking result, the second benchmarking result, and the third benchmarking result are convergent.

7. The method of claim 1, wherein:
evaluating the first benchmarking result and the second benchmarking result comprises determining that the second benchmarking result does not scale proportionately with the scaling factor as compared with the first benchmarking result; and
the method further comprises:
determining that after the second benchmarking test is performed, a maximum number of tests have been performed, and
determining that benchmarking results do not converge.

8. A method for performing benchmarking operations, the method comprising:
performing, within a processing system of a hardware platform, a first sequence of benchmarking tests on a component comprising a circuit of the hardware platform using a set of benchmarking parameters to obtain a first benchmarking result, wherein the set of benchmarking parameters includes a first sequence duration, and wherein the first benchmarking result includes a first minimum benchmarking result and a first maximum benchmarking result;
scaling the first sequence duration by a scaling factor to obtain a second sequence duration;
performing, within the processing system, a second sequence of benchmarking tests for the second sequence duration on the component to obtain a second minimum benchmarking result and a second maximum benchmarking result; and
determining whether the second minimum benchmarking result and the second maximum benchmarking result comprise either a new minimum benchmarking result or a new maximum benchmarking result.

9. The method of claim 8, wherein:
determining whether the second minimum benchmarking result and the second maximum benchmarking result comprise either a new minimum benchmarking result or a new maximum benchmarking result comprises determining that either the second minimum benchmarking result comprises a new minimum benchmarking result or the second maximum benchmarking result comprises a new maximum benchmarking result; and
the method further comprises:
scaling the second sequence duration by the scaling factor to obtain a third sequence duration,
performing a third sequence of benchmarking tests for the third sequence duration to obtain a third minimum benchmarking result and a third maximum benchmarking result, and
determining whether the third minimum benchmarking result and the third maximum benchmarking result comprise either a new minimum benchmarking result or a new maximum benchmarking result.

10. The method of claim 8, wherein determining whether the second minimum benchmarking result and the second maximum benchmarking result comprise either a new minimum benchmarking result or a new maximum benchmarking result comprises determining that neither the second minimum benchmarking result comprises a new minimum benchmarking result nor the second maximum benchmarking result comprises a new maximum benchmarking result.

11. The method of claim 10, further comprising:
in response to determining that neither the second minimum benchmarking result comprises a new minimum benchmarking result nor the second maximum benchmarking result comprises a new maximum benchmarking result, determining that a sufficient amount of benchmarking results have been obtained to determine benchmarking variance.

12. The method of claim 10, further comprising:
scaling the second duration by the scaling factor to obtain a third duration,
performing a third sequence of benchmarking tests with the third duration to obtain a third minimum benchmarking result and a third maximum benchmarking result, and
determining that neither the third minimum benchmarking result comprises a new minimum benchmarking result nor the third maximum benchmarking result comprises a new maximum benchmarking result.

13. The method of claim 12, further comprising:
determining that no new minimum benchmarking result or maximum benchmarking result is obtained for a benchmark sequence number confidence threshold number of times, and
determining that a sufficient amount of benchmarking results have been obtained to determine benchmarking variance.

14. The method of claim 8, wherein:
determining whether the second minimum benchmarking result and the second maximum benchmarking result comprise either a new minimum benchmarking result or a new maximum benchmarking result comprises determining that either the second minimum benchmarking result comprises a new minimum benchmarking result or the second maximum benchmarking result comprises a new maximum benchmarking result; and
the method further comprises:
determining that after the second sequence of benchmarking tests is performed, a maximum number of sequences of benchmarking tests have been performed.

15. An electronic device for performing benchmarking operations to obtain convergent benchmarking results, the electronic device comprising:
a hardware platform, comprising:
a benchmarking framework that includes an adaptive testing state machine and a test control module, the adaptive testing state machine operable to:
perform a first benchmarking test with a first length to obtain a first benchmarking result;
scale the first length by a scaling factor to obtain a second length;
perform a second benchmarking test with the second length to obtain a second benchmarking result; and
evaluate the first benchmarking result and the second benchmarking result to determine whether the second benchmarking result scales proportionately with the scaling factor as compared with the first benchmarking result.

16. The electronic device of claim 15, wherein:
the benchmarking framework comprises a hardware circuit within a field programmable gate array.

17. The electronic device of claim 15, wherein:
the benchmarking framework comprises a layer on top of a board support package of the hardware platform.

18. The electronic device of claim 15, wherein:
performing the first benchmarking test comprises performing, within a processing system of a hardware platform, the first benchmarking test on a component comprising a circuit of the hardware platform, wherein the set of benchmarking parameters includes a first length;

generating the updated set of benchmarking parameters comprises scaling the first length by a scaling factor to obtain a second length;

the benchmarking framework is further operable to perform, within the processing system, a second benchmarking test on the component with the second length to obtain a second benchmarking result; and the benchmarking framework is further operable to evaluate the first benchmarking result and the second benchmarking result to determine whether the second benchmarking result scales proportionately with the scaling factor as compared with the first benchmarking result.

19. The electronic device of claim 15, wherein:

determining whether the second minimum benchmarking result and the second maximum benchmarking result comprise either a new minimum benchmarking result or a new maximum benchmarking result comprises determining that either the second minimum benchmarking result comprises a new minimum benchmarking result or the second maximum benchmarking result comprises a new maximum benchmarking result; and the benchmarking framework is further operable to:

scale the second sequence duration by the scaling factor to obtain a third sequence duration, perform a third sequence of benchmarking tests for the third sequence duration to obtain a third minimum benchmarking result and a third maximum benchmarking result, and determine whether the third minimum benchmarking result and the third maximum benchmarking result comprise either a new minimum benchmarking result or a new maximum benchmarking result.

* * * * *